United States Patent [19]

Marcelloni

[11] Patent Number: 5,730,560
[45] Date of Patent: Mar. 24, 1998

[54] MULTI-STEP BUSHING RETENTION SYSTEM FOR ROTARY MACHINE TOOL

[75] Inventor: Frank Marcelloni, Windsor, Canada

[73] Assignee: Ford Global Technologies, Inc., Dearborn, Mich.

[21] Appl. No.: 741,061

[22] Filed: Oct. 28, 1996

[51] Int. Cl.⁶ .................................................. B23B 49/02
[52] U.S. Cl. ................................ 408/72 B; 408/115 B; 408/241 B
[58] Field of Search ........................ 408/72 B, 115 B, 408/115 R, 241 B, 103, 97

[56] References Cited

U.S. PATENT DOCUMENTS

| | | | |
|---|---|---|---|
| 2,558,814 | 7/1951 | Briney | 408/241 B |
| 3,336,822 | 8/1967 | Armacost | 408/241 B |
| 3,606,566 | 9/1971 | Bethke | 408/241 B |
| 5,664,913 | 9/1997 | Scholz | 408/241 B |

*Primary Examiner*—Daniel W. Howell
*Attorney, Agent, or Firm*—Jerome R. Drouillard

[57] ABSTRACT

A bushing system for guiding a bore forming apparatus within a machine tool includes a guide bushing with a central bore allowing passage of a rotating and axially moving tool, with the bushing having a generally cylindrical body with a radially extending flange having a free end and a stepped area adapted for engagement with the retainer. The retainer includes a complementary arcuate relief formed in an outer cylindrical surface for allowing the retainer to engage a stepped area formed in the guide bushing's radially extending flange. The retainer further includes a second radially extending flange with a diameter larger than the diameter of the retainer's body such that the second radially extending flange with abuttingly engage the free end of the guide bushing to maintain the bushing in axial register with a machine tool mounting fixture.

6 Claims, 2 Drawing Sheets

MULTI-STEP BUSHING RETENTION SYSTEM FOR ROTARY MACHINE TOOL

BACKGROUND OF THE INVENTION

1. Field of the Invention

The present invention relates to a system for piloting a rotary tool such as a milling cutter or drill into a workpiece.

2. Disclosure Information

When drilling, reaming, or milling with a rotary, axially extending cutter system, it is often necessary to provide a bushing for the purpose of locating the cutting tool in a precise location. Cylindrical bushings have been used for this purpose for a long period of time. Of course, during any drilling or milling operation, chips are formed, and such chips must be cleared after each drilling operation. Unfortunately, and particularly with deep bores, it is sometimes difficult to axially disengage a drill or mill from its guide bushing. In fact, if the chips are formed sufficiently tight and in sufficient quantity around the mill or drill, the bushing may be pulled axially from its fixture with such force that prior art retainers or clamps, such as that shown in FIG. 6, will be unable to retain the bushing axially in its fixture. This is because the bushing itself will fracture along a step line.

The inventor of the present multi-step bushing retention system has discovered that guide bushings may be accurately and robustly retained within a fixture of a machine tool by providing a bushing and retainer which provides multiple steps or buttresses for maintaining the bushing in contact with the fixture.

SUMMARY OF THE INVENTION

A bushing system for guiding a bore forming apparatus within a machine tool includes a guide bushing having a central bore adapted to allow passage therethrough of a rotating tool, with the bushing having a generally cylindrical body with a first radially extending flange formed on one end thereof, with the flange having a free end and a stepped area adapted for engagement with a retainer.

Another part of the present system is a retainer for maintaining the position of the bushing within a machine tool fixture. The retainer includes a generally cylindrical body having a complementary arcuate relief formed in its outer cylindrical surface so as to define a step for allowing the retainer to engage the stepped area formed in the first radially extending flange of the guide bushing. The retainer also includes a second radially extending flange with a diameter larger than the diameter of the generally cylindrical body, with a second radially extending flange engaging the free end of the guide bushing such that the guide bushing is maintained in place by both the engagement of the stepped areas of the bushing and retainer and by abutment of the second radially extending flange with the free end of the guide bushing.

According to another aspect of the present invention, a bushing system having the guide bushing as previously described includes a guide bushing having an arcuate projection for engaging the arcuate relief section formed in the cylindrical outer surface of the retainer. A superimposed, concave undercut is engaged by the retainer's generally cylindrical body.

According to yet another aspect of the present invention, the retainer not only prevents the guide bushing from disengaging with the mounting fixture contained in the machine tool, but also prevents the guide bushing from rotating about an axis parallel to its central bore. Typically, the retainer and guide bushing are attached to a common mounting fixture, with the retainer being maintained in contact with the guide bushing and mounting fixture by a fastener extending through the retainer into engagement with the mounting fixture.

It is an object of the present invention to provide a guide bushing system for a machine tool in which the bushing is retained by a double thickness of material provided by the unique configuration of the present bushing retainer.

It is an advantage of the present bushing retention system that breakage of bushings associated with prior art bushing retention systems is obviated.

Other objects and advantages as well as features of the present invention will be apparent to the reader of this specification.

DETAILED DESCRIPTION OF PREFERRED EMBODIMENT

Figures 1, 2, 6:
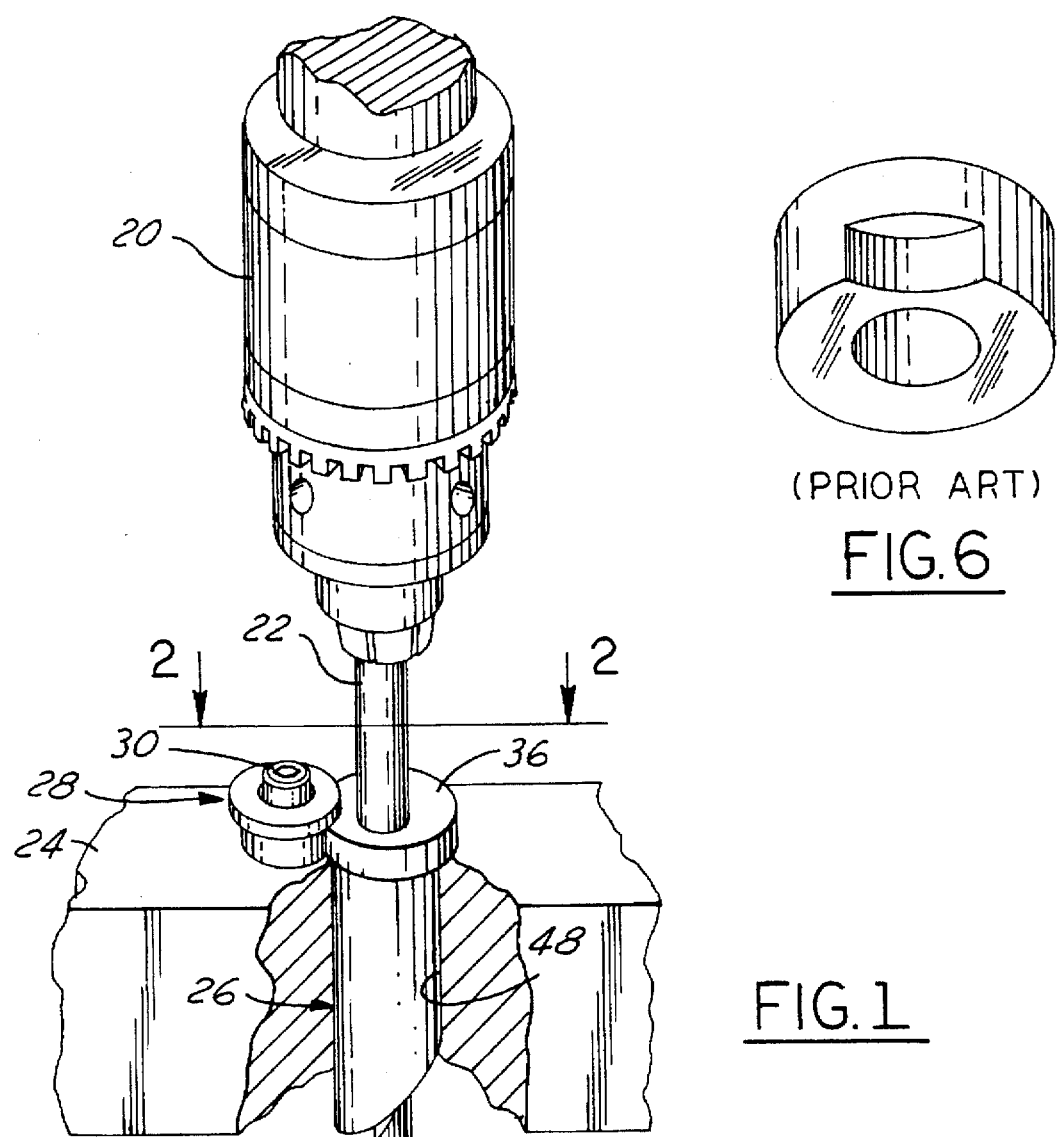
FIG. 1 is a perspective view of a machine tool having a bushing retention system according to the present invention.
FIG. 2 is a plan view of the system of the present invention taken along the line 2—2 of FIG. 1.
FIG. 6 illustrates a prior art retainer.

As shown in FIG. 1, the present multi-step bushing retention system is intended to be used with a machine tool in which one or more power heads 20 rotationally and axially engages a rotary tool, in this case, drill 22, with a workpiece (not shown). As noted above, it is necessary upon withdrawing tool drill 22 through the workpiece and bushing 26 to have sufficient robustness in terms of axial retention force exerted upon bushing 26 to assure that bushing 26 will not become detached from mounting fixture 24. The present invention assures that such retention force will be maintained and available at all times.

Bushing 26 is held within bore 48 formed in fixture 24. Fixture 24, in turn, may be mounted into any type of machine tool suitable for use in boring, honing, drilling, tapping, or other types of operations in which a tool is advanced rotationally and axially into a workpiece and then withdrawn through the guide bushing. Thus, as used herein, the terms "bore forming" and "boring" are intended to apply to a range of machine operations such as drilling, tapping, reaming, milling, and other types of such rotary and axially directed machine operations known to those skilled in the art suggested by this disclosure.

Figure 3:
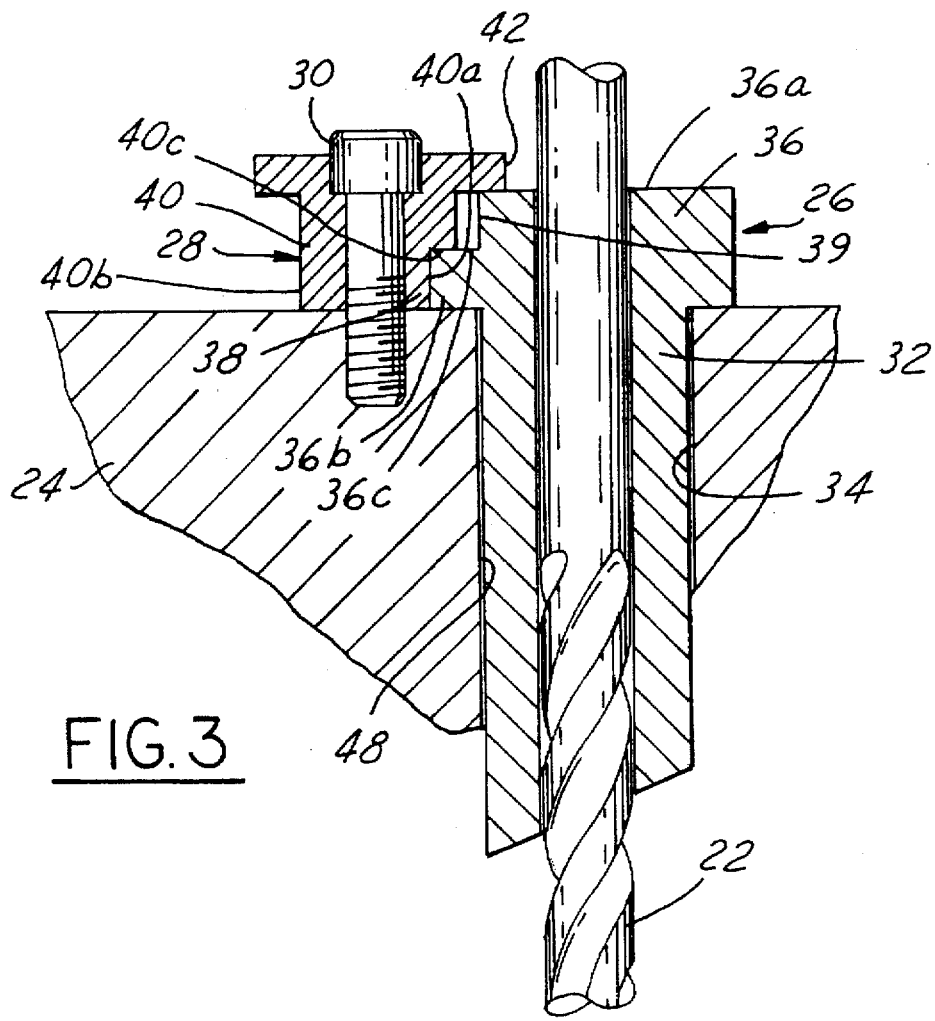
FIG. 3 is a sectional view taken through a machine mounting fixture, bushing, and retention system according to the present invention, which also shows a tool being inserted through the guide bushing.

FIG. 1 illustrates that guide bushing 26 is nonrotationally maintained in axial contact with mounting fixture 24 by means of retainer 28 and screw 30 which, as shown in FIG. 3, is threadedly engaged with fixture 24. As shown in FIG. 3, drill 22 is allowed to pass through central bore 34 within guide bushing 26.

As shown in FIG. 2, guide bushing 26 and retainer 28 are mounted side-by-side within fixture 24. Guide bushing 26 and retainer 28 are configured according to the present invention such that retainer 28 abuts guide bushing 26 in two locations so as to double the axial retention force provided by the prior art bushing shown in FIG. 6. To this end, guide bushing 26 is provided with first radially extending flange 36, which is formed on one end of guide bushing 26. First radially extending flange 36 has free end 36a (FIG. 3) and stepped area 36b which is formed by locally reducing the thickness of flange 36. As shown with particularity in FIG. 3, retainer 28 is overlaid upon and abuts first radially extending flange 36 upon free end 36a and also upon stepped area 36b.

Figure 4:
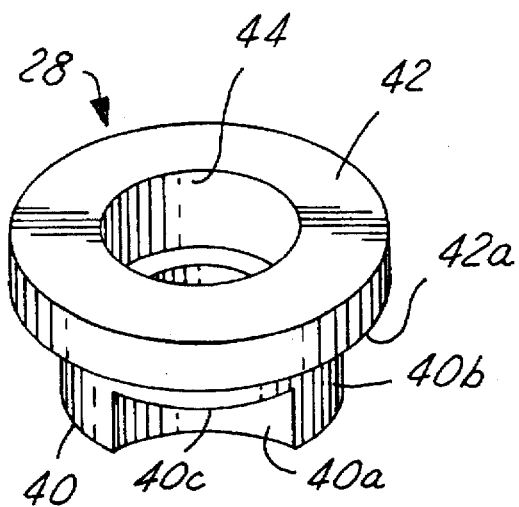
FIG. 4 is a perspective view of a bushing retainer according to the present invention with the retainer being oriented generally as shown in FIG. 1.
Figure 5:
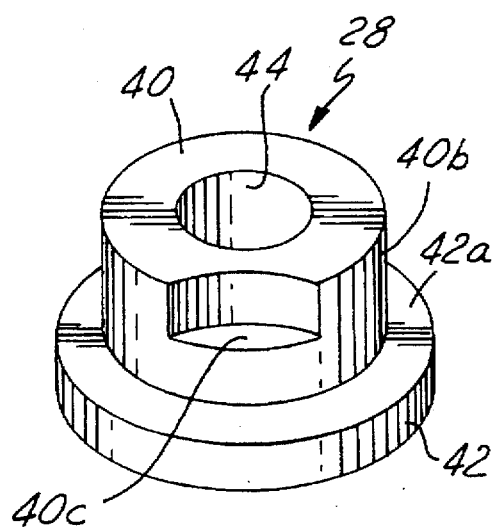
FIG. 5 illustrates a retainer according to the present invention viewed from the end of the retainer which is normally in contact with the holding fixture within a machine tool.

Details of the construction of retainer 28 is shown with particularity in FIGS. 4 and 5. Retainer 28 comprises a generally cylindrical body 40 having arcuate relief 40a formed in outer cylindrical surface 40b of body 40. As is seen in FIG. 5, step 40c is defined by arcuate relief 40a. Relief 40a is said to be a complementary relief because it is one of the features of retainer 28 which permit mating engagement with guide bushing 26.

Step 40c engages surface 36c of stepped area 36b so as to provide a portion of the axial retention force provided by a system according to the present invention. The balance of the axial retention force is provided by the interaction of second radially extending flange 42, which extends from outer cylindrical surface 40b and which abuttingly engages free end 36a of guide bushing 26. Thus, guide bushing 26 is maintained in place by the engagement of stepped areas 36b and 40c, as well as by engagement of flange surface 42a with free end 36a of first flange 36. This construction has been found to eliminate the breakage problem associated with prior art bushing retention systems, which would allow the bushing to become axially disengaged from the fixture when the cutting tool is being withdrawn from the bushing.

While the invention has been shown and described in its preferred embodiments, it will be clear to those skilled in the arts to which it pertains that many changes and modifications may be made thereto without departing from the scope of the invention.

I claim:

1. A bushing system for guiding a bore forming apparatus within a machine tool, comprising:
   a guide bushing having a central bore adapted to allow passage therethrough of a rotating tool, with said bushing having a generally cylindrical body with a first radially extending flange formed on one end thereof, and with said flange having a free end and a stepped area adapted for engagement with a retainer; and
   a retainer for maintaining the position of said bushing within a machine tool, with said retainer comprising:
   a generally cylindrical body having a complementary arcuate relief formed in its outer cylindrical surface, thereby defining a step for allowing the retainer to engage the stepped area formed in said first radially extending flange, with said retainer further comprising a second radially extending flange with a diameter larger than the diameter of the retainer's generally cylindrical body, with the second radially extending flange abuttingly engaging the free end of the guide bushing such that the guide bushing is maintained in place by both the engagement of the stepped areas of the bushing and retainer, as well as by the second radially extending flange.

2. A bushing system according to claim 1, wherein the stepped area of said guide bushing has an arcuate projection for engaging the arcuate relief section formed in the cylindrical outer surface of the retainer and a super imposed concave undercut engaged by the retainer's generally cylindrical body.

3. A bushing system according to claim 1, wherein said retainer not only prevents said guide bushing from disengaging from a mounting fixture contained within a machine tool, but also prevents the guide bushing from rotating about an axis parallel to its central bore.

4. A bushing system according to claim 1, wherein said retainer and said guide bushing are attached to a common mounting fixture, with said retainer being maintained in contact with said guide bushing and said mounting fixture by a fastener extending through the retainer into engagement with the mounting fixture.

5. A bushing system for guiding a rotary boring apparatus within a machine tool, comprising:
   a guide bushing having a central bore adapted to allow axial passage therethrough of a rotating tool, with said bushing having a generally cylindrical body with a radially extending flange formed on one end thereof, and with said flange having a free end and a stepped area adapted for engagement with a retainer, with the stepped area having an arcuate projection for engaging a concave relief section formed in a cylindrical outer surface of a retainer and a superimposed concave undercut for allowing a retainer to abuttingly engage said arcuate projection; and
   a retainer for maintaining the guide bushing in a position which is fixed both radially and axially within a machine tool, with said retainer comprising:
   generally cylindrical body having a stepped radially extending retainer flange formed on one end thereof, with said radially extending flange having a first step for abutting the arcuate projection of the guide bushing and a second portion for abutting the free end of the guide bushing such that the guide bushing is maintained in place by both the first and second steps of the retainer flange.

6. A bushing system according to claim 5, wherein said guide bushing is slidingly engaged with a bore formed in a mounting fixture adapted to be housed within a machine tool, with said retainer being maintained in abutting contact with said guide bushing and said mounting fixture by a fastener extending through the retainer into engagement with the mounting fixture.

* * * * *